United States Patent [19]

Fussnegger et al.

[11] Patent Number: 5,381,849

[45] Date of Patent: Jan. 17, 1995

[54] CASTING METHOD FOR CASTING A PART ONTO A HOLLOW SECTION

[75] Inventors: Wolfgang Fussnegger, Rohrau; Werner Heiss, Sindelfingen, both of Germany

[73] Assignee: Mercedes-Benz AG, Germany

[21] Appl. No.: 169,126

[22] Filed: Dec. 20, 1993

[30] Foreign Application Priority Data

Dec. 18, 1992 [DE] Germany .............. 4242896

[51] Int. Cl.6 ............................ B22D 19/00
[52] U.S. Cl. ..................... 164/102; 164/112; 164/106; 164/108
[58] Field of Search ............... 164/97, 98, 105, 112, 164/102, 103, 104, 106, 108

[56] References Cited

U.S. PATENT DOCUMENTS 2,264,456  12/1941  Roth ........................... 164/98
4,145,068   3/1979  Toyomasu ................. 164/98
4,175,725  11/1979  Cattano ...................... 164/332

FOREIGN PATENT DOCUMENTS 521654   3/1931  Germany .
1282246  11/1968  Germany .
2725979   1/1979  Germany .

Primary Examiner—P. Austin Bradley
Assistant Examiner—James Miner
Attorney, Agent, or Firm—Evenson, McKeown, Edwards & Lenahan

[57] ABSTRACT

A method for casting a cast part onto the end of a hollow section places the end of the hollow section in a defined position in a die which is then closed. The end opening in the hollow section is closed in a sealed manner against the penetration of cast material, at least during casting, the molten cast material is introduced into the remaining free space in the die and the hollow section is thereby cast around in a positive-locking manner, at least at the end. To improve the fixing of the hollow sections within the cast part, the hollow section is cooled during the casting of the cast part.

7 Claims, 3 Drawing Sheets

5,381,849

CASTING METHOD FOR CASTING A PART ONTO A HOLLOW SECTION

BACKGROUND AND SUMMARY OF THE INVENTION

The present invention relates to a method for casting a cast part onto the end of a hollow section, and, more particularly, to a casting method in which the end of the hollow section is placed in a defined position in a die, the die is closed, the end opening in the hollow section is closed in a sealed manner against the penetration of cast material, at least during casting, the molten cast material is introduced into the remaining free space in the die and the hollow section is thereby cast around in a positive-locking manner, at least at the end.

German Auslegeschrift 2,725,979 describes production of a bicycle frame from tubes, with the tube ends being connected to one another in the region of a frame intersection by a pressure die-cast part cast on in a positive-locking manner. To prevent the open ends of the tubes from being filled with the molten material of the pressure die-cast part during the casting of the said pressure die-cast part, these openings are closed by caps. Protection against the tubes being pulled out of the cast part after it has cooled is achieved by providing the cast-around end sections of the tubes with notches, holes, undercuts and/or expanded portions or the like, behind or around which the cast material flows during the casting of the cast part. Despite the positive engagement between the tube and the cast part, this joint is sensitive to severe vibration such as that which acts, for example, on a motor vehicle door.

German Patent 521,654 describes tubes cast-around in a positive-locking manner at the ends by a pressure die-cast part. To increase the strength of the joint, the tubes are expanded in a dovetail shape in their cast-around end section. To cast on the pressure die-cast part, the openings in the ends of the tubes are temporarily closed by a casting core. To ensure that there is fluid communication between the tubes and the hollow cast part, the casting core is removed after the solidification of the pressure die-cast part. However, casting with a casting core is expensive since it is first necessary to produce the casting core and then remove it again. Moreover, this joint between the tube and cast part is also sensitive to severe vibration.

It is an object of the present invention to develop a method for casting a cast part onto the end of a hollow section in which the joint between the cast part and the hollow section is insensitive to vibrations.

The foregoing object has been achieved according to the present invention by a method in which the hollow section is cooled during the casting of the cast part, in that the material at the end of the hollow section to be embedded is deformed by the cast material during casting and in that the deformed material of the hollow section is pressed into positive engagement with a groove on the closure. By virtue of the cooling of the hollow section during casting, the cast material approaches more closely the dimensions which the hollow section has at normal temperature since the hollow section is subject to less thermal expansion than in the conventional methods. Because the cast material then shrinks to a greater extent relative to the hollow section, when the cast part cools, the hollow section is then compressed more strongly in the cast part than hitherto. This stronger compression increases the strength of the joint between the cast part and the hollow section.

BRIEF DESCRIPTION OF THE DRAWINGS

These and further objects, features and advantages of the present invention will become more apparent from the following detailed description thereof when taken in conjunction with the accompanying drawings wherein.

DETAILED DESCRIPTION OF THE DRAWINGS

Figure 1:
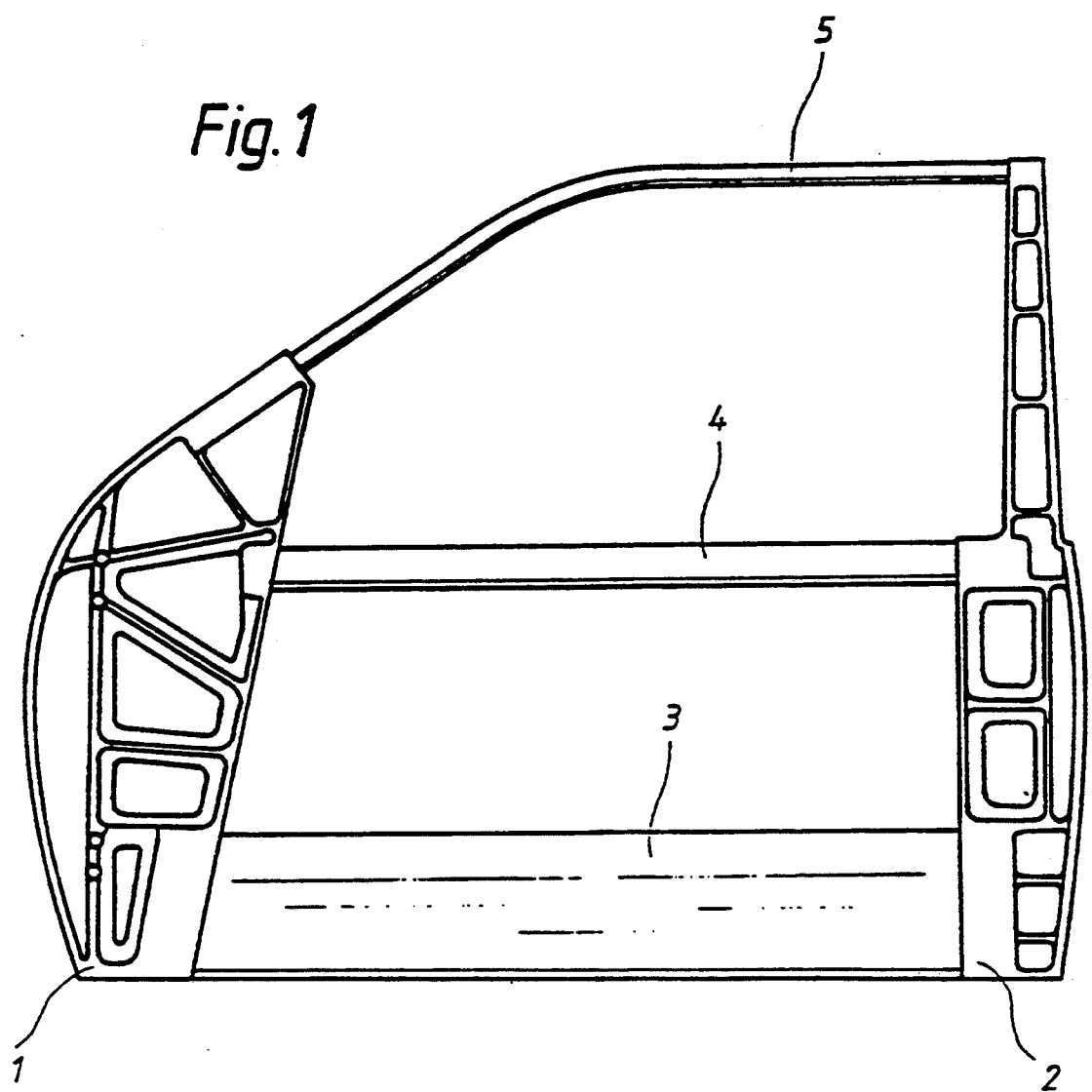
FIG. 1 is an elevational view of a skeleton of a vehicle door with cast frame parts in which hollow sections are embedded along the edge.

FIG. 1 shows a skeleton of a vehicle door which, for reasons of weight, is produced entirely from aluminum. The frame parts 1, 2 are cast aluminum. Between the frame parts 1, 2, the vehicle door has a plurality of crossbeams 3, 4, 5 arranged transversely to the frame parts 1, 2 and 3, 4, 5 being configured as hollow and inexpensive extruded sections. The crossbeams 3, 4, 5, which in this illustration of the method form the window frame, a central door reinforcement and a lower door reinforcement respectively, connect the two frame parts 1, 2 firmly to one another and are surrounded in a positive-locking manner in their end sections by the frame parts 1, 2.

To produce the above-described vehicle door, the crossbeams 3, 4, 5, which, because of the saving in weigh, are hollow sections, are placed in a defined position in a die for the two frame parts 1, 2. One end section of each of the crossbeams 3, 4, 5 is arranged in a respective casting area of the two frame parts 1, 2. The die 6 is then closed, the opening at the end of a crossbeam 4 being closed by a conical closure 7, as shown in FIG. 3. Another possibility for the closure at the open end of the crossbeams 3, 4, 5 is, for example, that shown in FIG. 2, by way of caps 8, 9 which are inserted into the opening in the open ends or cover the opening.

After the die 6 has been closed, the frame parts 1, 2 are cast by introducing the molten aluminum into the remaining free space in the die 6, and the crossbeams 3, 4, 5 are cast around in a positive-locking manner at the ends. During the casting process, the openings in the ends of the crossbeams 3, 4, 5 are sealed against the penetration of molten aluminum by the caps 8, 9 or the closure 7 to avoid an unnecessary increase in the weight of the door and unnecessary consumption of aluminum.

Figure 4:
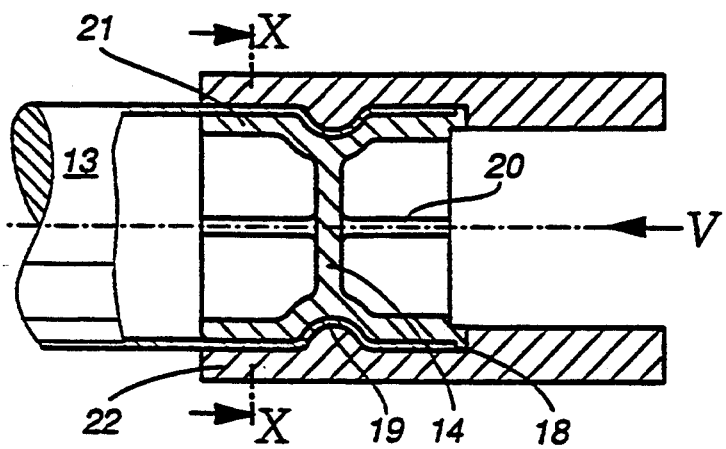
FIG. 4 is a sectional view through another hollow section cast around at the end and closed with a plug.
Figure 5:
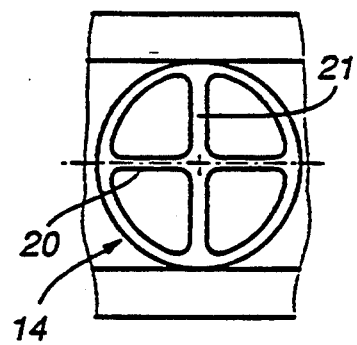
FIG. 5 is a side view of FIG. 4 in the direction of arrow V.
Figure 6:
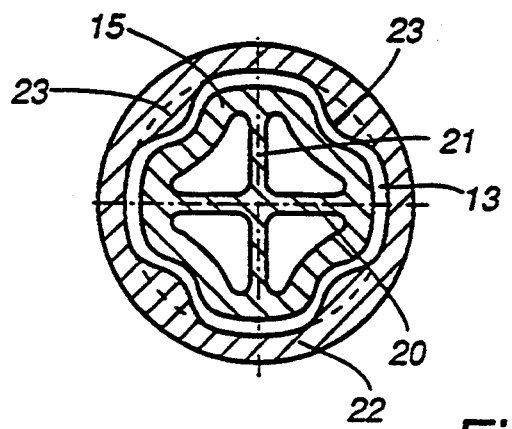
FIGS. 6 to 8 show a number of embodiments of cross-sections through hollow sections cast around at the ends and closed with various plugs shown along the line X—X of FIG. 4.
Figure 7:
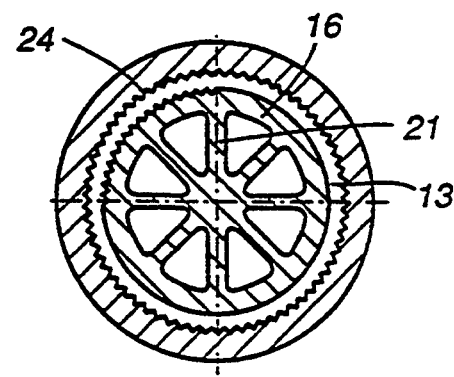
Figure 8:
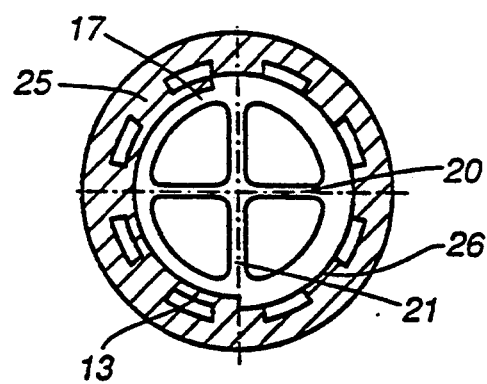

Further methods of closing the hollow sections are shown in FIGS. 4 to 8. Plugs 14, 15, 16, 17 of various configurations are here used to close the hollow section, which in this case is designed as a tube 13. As shown in FIG. 4, the plug 14 is pushed into the end of the tube 13 until the rim 18 strikes against the tube 13. The tube 13 is then placed in the die 6 and the part 22 to be cast is cast on. During the casting on of this part 22, the tube 13 is pushed into a groove 19 in the plug 14, thereby securing the tube 13 against being pulled out. In order to strengthen the plug 14, the plug 13 has central webs 20 and longitudinal webs 21 on the inside. In order to secure the tube 13 against rotation, the respective plug 15, 16, 17 can be provided with indentations 23 (see FIG. 6), serrations 24 (see FIG. 7) or holes 25 with additional longitudinal grooves 26 (see FIG. 8).

To ensure that the frame parts 1, 2 press in with a high retaining force on crossbeams 3, 4, 5 cast around at the ends, the crossbeams 3, 4, 5 are cooled during the casting of the frame part. In the case of the crossbeam 4 closed at the end by the closure 7, this cooling is advantageously effected by passing a coolant through the closure 7 during casting. Water mist passed through the hollow crossbeam 3, 4, 5 and on through the closure 7 has proven to be an advantageous coolant for this purpose since, inter alia, it requires little sealing in relation to the molten metal. Water mist is also advantageous where the crossbeams 3, 4, 5 are closed at the ends by caps 8, 9 since the return of the vaporized water can be accomplished in a simple manner through the inlet opening for the water mist.

Figure 2:
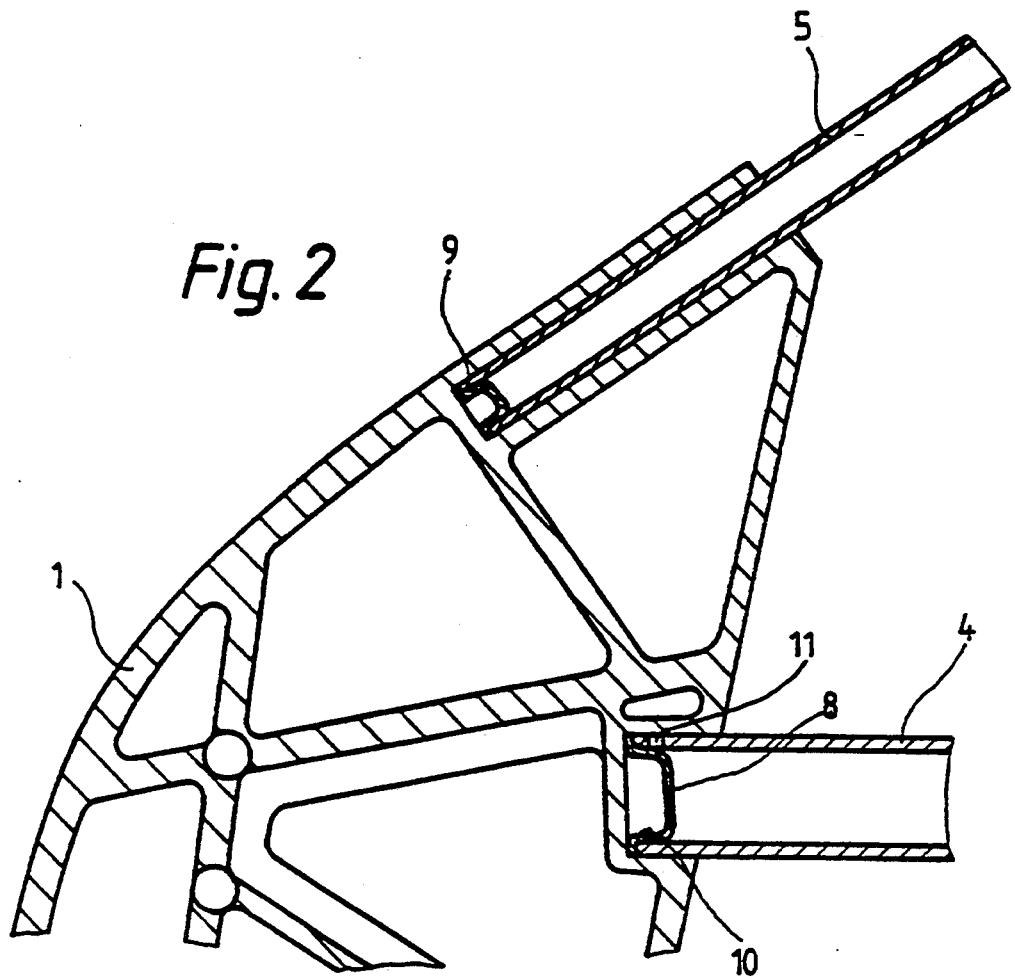
FIG. 2 is a detail of a cross-section of the vehicle door according to FIG. 1 with crossbeams arranged with their ends in a frame part.
Figure 3:
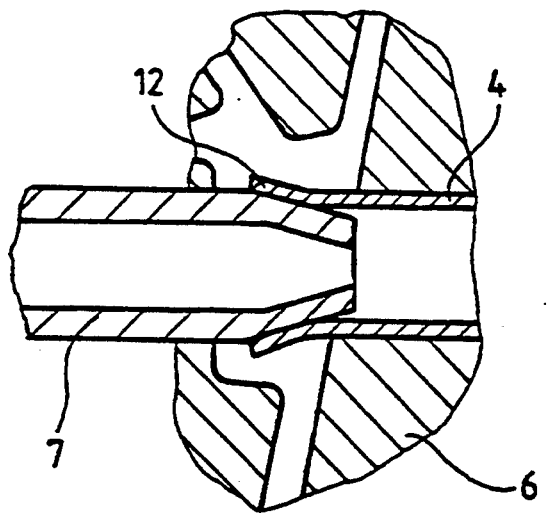
FIG. 3 is a detail of a die with a crossbeam end section arranged therein.

To further increase the retaining force of the positive connection between the frame parts 1, 2 and the crossbeams 3, 4, 5, the crossbeams 3, 4, 5 can furthermore be provided in their cast-around end section with notches 10, holes 11, undercuts and/or expanded portions 12 or the like, as shown in FIGS. 2 and 3. During the casting of the frame parts 1, 2, the cast material flows behind or around these features, the crossbeams 3, 4, 5 thereby being additionally form-lockingly secured in the frame parts 1, 2 in a manner similar to a barb. A further way of increasing the retaining force in the case of the opening sealed off by means of the closure 7 can be achieved in an advantageous manner if, during casting, the closure 7 is pushed into the opening, the aluminum rim of which is softened somewhat by the heat of the molten metal. As a result, the end of the crossbeam 3, 4, 5 then expands in the form of a trumpet. It may furthermore be advantageous to coat the surface of the crossbeams 3, 4, 5 in the area of their contact with the frame parts 1, 2 with a solder or flux, the melting point of which is below the melting point of the molten aluminum. The solder then permits a more intimate and firmer connection between the outer surface of the crossbeams 3, 4, 5 and the frame parts 1, 2.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for casting a cast part onto the end of a hollow section, comprising the steps of placing an end of the hollow section in a defined position in a die, closing the die, sealingly closing an end opening in the hollow section against the penetration of cast material, at least during casting, and introducing the molten cast material into a remaining free space in the die and casting the hollow section around in a positive-locking manner, at least at the end thereof, wherein the hollow section is cooled during the casting, the material at the end of the hollow section to be embedded is deformed by the cast material during casting and the deformed material of the hollow section is pressed into positive engagement with a groove on the closure.

2. The method according to claim 1, wherein the end opening in the hollow section is closed during casting by a closure, and a cooling medium is passed through the closure during casting to cool the hollow section.

3. The method according to claim 2, wherein the cooling medium comprises air containing suspended water droplets or water mist.

4. The method according to claim 1, wherein a surface of the hollow section has applied thereto, in an area of its contact with the cast part, a solder or flux having a melting point below the melting point of the cast material.

5. The method according to claim 1, wherein the hollow section is an extruded light alloy comprising one of an aluminum or magnesium alloy.

6. The method according to claim 1, wherein the cast material is a light alloy comprising one of an aluminum or magnesium alloy.

7. The method according to claim 1, wherein the cast part is a frame part of a vehicle door, and the hollow section is a crossbeam placed between and embedded in the frame parts.

* * * * *